United States Patent
Xue et al.

(10) Patent No.: US 12,092,927 B2
(45) Date of Patent: Sep. 17, 2024

(54) DISPLAY PANEL AND DISPLAY DEVICE

(71) Applicant: HKC CORPORATION LIMITED, Shenzhen (CN)

(72) Inventors: Xinghao Xue, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/083,408

(22) Filed: Dec. 16, 2022

(65) Prior Publication Data
US 2024/0036401 A1 Feb. 1, 2024

(30) Foreign Application Priority Data
Jul. 29, 2022 (CN) .......................... 202210904745.5

(51) Int. Cl.
G02F 1/1337 (2006.01)
G02F 1/1333 (2006.01)
G02F 1/1335 (2006.01)

(52) U.S. Cl.
CPC .. G02F 1/133749 (2021.01); G02F 1/133357 (2021.01); *G02F 1/133512* (2013.01)

(58) Field of Classification Search
CPC ......... G02F 1/133761; G02F 1/133757; G02F 1/133738; G02F 1/133776
See application file for complete search history.

(56) References Cited

U.S. PATENT DOCUMENTS

| | | | |
|---|---|---|---|
| 2007/0004071 A1* | 1/2007 | Lee | G02F 1/134336 438/30 |
| 2016/0342030 A1* | 11/2016 | Kim | G02F 1/1341 |
| 2016/0377923 A1* | 12/2016 | Son | G02F 1/133707 349/42 |
| 2017/0102590 A1* | 4/2017 | Wang | G02F 1/134363 |

FOREIGN PATENT DOCUMENTS

| | | | | |
|---|---|---|---|---|
| CN | 104460116 A | | 3/2015 | |
| CN | 11142300 A | | 5/2020 | |
| CN | 111142300 A | * | 5/2020 | ........... G02F 1/1323 |

* cited by examiner

*Primary Examiner* — Paul C Lee

(57) ABSTRACT

A display panel and a display device are disclosed. The display panel includes a first substrate, a second substrate, and a liquid crystal layer disposed therebetween. The first substrate includes a first base and a plurality of pixel units arranged thereon in an array. The pixel units in odd-numbered columns are first pixel units, and those in even-numbered columns are second pixel units. An alignment direction of the first substrate is perpendicular to an extending direction of the column of the pixel units. A liquid crystal molecule corresponding to each first pixel unit defines a first pretilt angle, and that corresponding to each second pixel unit defines a second pretilt angle. An opening direction of the first pretilt angle is consistent with the alignment direction of the first substrate, and an opening direction of the second pretilt angle is opposite to the alignment direction of the first substrate.

12 Claims, 3 Drawing Sheets

DISPLAY PANEL AND DISPLAY DEVICE

CROSS-REFERENCE TO RELATED APPLICATIONS

This application claims the priority and benefit of Chinese patent application 202210904745.5, titled "Display Panel and Display Device" and filed Jul. 29, 2022, with China National Intellectual Property Administration, the entire contents of which are incorporated herein by reference.

TECHNICAL FIELD

This application relates to the field of display technology, and more particularly relates to a display panel and a display device.

BACKGROUND

The description provided in this section is intended for the mere purpose of providing background information related to the present application but doesn't necessarily constitute prior art.

TFT-LCD (Thin Film Transistor Liquid Crystal Display) has become the dominant technology in the flat panel display field thanks to its advantages of low power consumption, high image quality and low price. TFT-LCD can be divided into a TN (Twisted Nematic) display panel, an IPS (In-Plane Switching) display panel, a VA (Vertical Alignment) display panel, and a MVA (Multi-Domain Vertical Alignment) display panel, depending on the display mode. Among them, the IPS display mode realizes the screen display by controlling the liquid crystal molecules to rotate in a plane. In this mode, the rotation of the liquid crystal molecules is mainly controlled by a horizontal electric field on the side of the array substrate. This mode has a relatively wide display viewing angle and high transmittance.

But the IPS display mode has the problem of light leakage. For example, in the dark state, the incident light at oblique angles is easy to leak from the polarizer, especially in the position of the angle bisector. Moreover, due to the alignment of the liquid crystal, the pretilt angle of the liquid crystal molecules is not able to reach 0 degrees, resulting in a large difference in the light leakage colors, leading to the problem of color shift of the light leakage, which has become a technical problem to be solved urgently by those skilled in the art.

SUMMARY

It is therefore a purpose of the present application to provide a display panel and a display device to improve the problem of color shift of light leakage.

The present application discloses a display panel, comprising a first substrate, a second substrate, and a liquid crystal layer disposed between the first substrate and the second substrate. The first substrate includes a first base and a plurality of pixel units. The pixel units are arranged on the first base in an array. Among the plurality of pixel units, the pixel units in odd-numbered columns are first pixel unit, and the pixel units in even-numbered columns are second pixel unit. The alignment direction of the first substrate is perpendicular to the extending direction of the column pixel units. The liquid crystal molecules corresponding to the first pixel unit form a first pretilt angle. The liquid crystal molecules corresponding to the second pixel unit form a second pretilt angle. The opening direction of the first pretilt angle is consistent with the alignment direction of the first substrate. The opening direction of the second pretilt angle is opposite to the alignment direction of the first substrate.

In some embodiments, the first substrate further includes a first planarization layer. The first planarization layer includes a plurality of columns of first planarization portions and a plurality of columns of second planarization portions, where the first planarization portions are disposed corresponding to the first pixel units, and the second planarization portions are disposed corresponding to the second pixel units. The surface of the first planarization portion is gradually raised along the alignment direction, and the surface of the second planarization portion is gradually lowered along the alignment direction. The first planarization portion is used to make the opening direction of the first pretilt angle of the liquid crystal molecules corresponding to the first pixel unit consistent with the alignment direction of the first substrate. The second planarization portion is used to make the opening direction of the second pretilt angle of the liquid crystal molecules corresponding to the second pixel unit opposite to the alignment direction of the first substrate.

In some embodiments, the maximum height of the surface of the first planarization portion is consistent with the maximum height of the surface of the second planarization portion, and the minimum height of the surface of the first planarization portion is consistent with the minimum height of the surface of the second planarization portion.

In some embodiments, the second substrate includes a second base and a second planarization layer. The second planarization layer is disposed on the second base. The second planarization layer includes a plurality of columns of third planarization portions and a plurality of columns of fourth planarization portions. The plurality of columns of the third planarization portions and the plurality of columns of the fourth planarization portions are arranged alternately. The third planarization portions are disposed corresponding to the first pixel units, and the fourth planarization portions are disposed corresponding to the second pixel units. The surface of the third planarization portion is gradually lowered along the alignment direction, and the surface of the fourth planarization portion is gradually raised along the alignment direction.

In some embodiments, the thickness of the first planarization portion gradually increases in the alignment direction, and the thickness of the second planarization portion gradually decreases in the alignment direction. The acute angle formed by the surface of the first planarization portion and the plane where the second substrate is located is greater than or equal to 1 degree and less than or equal to 3 degrees. The acute angle formed by the surface of the second planarization portion and the plane where the second substrate is located is greater than or equal to 1 degree and less than or equal to 3 degrees.

In some embodiments, the acute angle formed by the surface of the first planarization portion and the plane where the second substrate is located is greater than the acute angle formed by the surface of the second planarization portion and the plane where the second substrate is located. The width of the first planarization portion in the alignment direction is smaller than the width of the second planarization portion in the alignment direction.

In some embodiments, the first pretilt angle is equal to the second pretilt angle.

In some embodiments, the pixel unit includes a plurality of sub-pixels, and the plurality of sub-pixels are arranged in rows or columns. Each column of pixel units includes one column of sub-pixels or multiple columns of sub-pixels. One column of the first planarization portions is disposed corresponding to one column of the sub-pixels or multiple columns of sub-pixels. One column of the second planarization portions is disposed corresponding to one column of the sub-pixels or a plurality of columns of the sub-pixels.

In some embodiments, the first substrate further includes a first planarization layer. The first planarization layer includes a plurality of columns of first planarization portions and a plurality of columns of second planarization portions. The first planarization portions are arranged corresponding to the first pixel units, and the second planarization portions are arranged corresponding to the second pixel units. The surface of the first planarization portion is gradually raised along the alignment direction of the first substrate, and the surface of the second planarization portion is parallel to the surface of the second substrate, so that the first pretilt angle of the liquid crystal molecules corresponding to the first pixel unit is consistent with the alignment direction of the first substrate.

The present application further discloses a display device comprising the above-mentioned display panel.

In this application, the opening directions of the first pretilt angle and the second pretilt angle of the liquid crystal molecules corresponding to adjacent pixel units are set in opposite directions. Correspondingly, the pretilt directions of the liquid crystal molecules in the adjacent pixel unit areas are opposite. That is, the pretilt direction of the liquid crystal molecules in the first pixel unit area is opposite to the pretilt direction of the liquid crystal molecules in the second pixel unit area. Therefore, the liquid crystal molecules corresponding to the first pixel unit and the second pixel unit have different optical path differences, and the first pixel unit and the second pixel unit are arranged alternately so that the corresponding liquid crystal molecules in different pretilt directions are also arranged alternately so that liquid crystal molecules with different optical path differences can compensate each other to make up for the color shift problem caused by a single optical path difference in the case of light leakage in the dark state. In short, by changing the pretilt angle of the liquid crystal molecules, the angles in different directions are matched and compensated for each other, so as to achieve the effect of improving the color shift of light leakage in the dark state.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
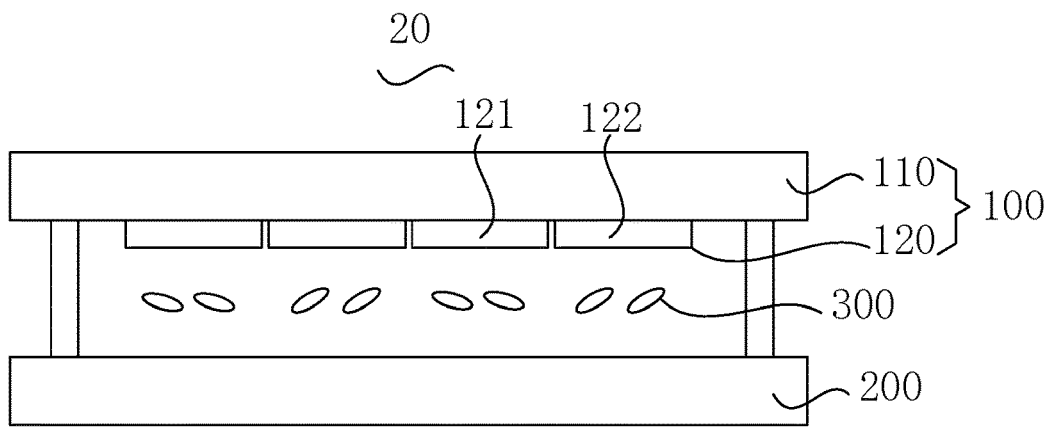
FIG. 1 is a schematic diagram of a display panel according to a first embodiment of the present application.

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of" and the like mean two or more. In addition, terms "up", "down", "left", "right", "vertical", and "horizontal", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of a display panel according to a first embodiment of the present application. As shown in FIG. 1, the present application discloses a display panel 20. The display panel 20 includes a first substrate 100, a second substrate 200 and a liquid crystal layer disposed between the first substrate 100 and the second substrate 200. The first substrate 100 includes a first base 110 and a plurality of pixel units 120. The pixel units 120 are arranged on the base in an array. Among the plurality of pixel units 120, the pixel units 120 in odd-numbered columns are first pixel units 121, the pixel units 120 in even-numbered columns are second pixel units 122. The alignment direction of the first substrate is perpendicular to the extending direction of the column pixel units 120. The liquid crystal molecules corresponding to the first pixel units form a first pretilt angle. The liquid crystal molecules corresponding to the second pixel unit form a second pretilt angle. The opening direction of the first pretilt angle is consistent with the alignment direction of the first substrate. The opening direction of the second pretilt angle is opposite to the alignment direction of the first substrate.

In the present application, the opening directions of the first pretilt angle and the second pretilt angle of the liquid crystal molecules 300 corresponding to the adjacent pixel units 120 are opposite to each other. Correspondingly, the pretilt directions of the liquid crystal molecules in the adjacent pixel unit areas are opposite. That is, the pretilt direction of the liquid crystal molecules 300 in the area of the first pixel unit 121 is opposite to the pretilt direction of the liquid crystal molecules 300 in the area of the second pixel unit 122. Therefore, the liquid crystal molecules 300 corresponding to the first pixel unit 121 and the second pixel unit 122 have different optical path differences. Moreover, the first pixel unit 121 and the second pixel unit 122 are arranged at intervals, and the corresponding liquid crystal molecules 300 in different pretilt directions are also arranged at intervals, so that the liquid crystal molecules 300 with different optical path differences can compensate each other and make up for the color shift problem caused by a single optical path difference in the case of dark state light leakage. In short, by changing the pretilt angle of the liquid crystal molecules 300, the angles in different directions are matched and compensated for each other, so as to achieve the effect of improving the color shift of light leakage in the dark state.

It should be understood that the acute angle formed from the direction of the long axis of the liquid crystal molecule corresponding to the first pixel unit to the plane of the second substrate is the first pretilt angle, and the acute angle from the direction of the long axis of the liquid crystal molecule corresponding to the second pixel unit to the plane of the second substrate is the second pretilt angle. The above-mentioned opening direction of the first pretilt angle is consistent with the alignment direction of the first substrate, and the opening direction of the second pretilt angle is opposite to the alignment direction of the first substrate. That is, the pretilt direction of the liquid crystal molecule 300 corresponding to the first pixel unit 121 is opposite to the pretilt direction of the liquid crystal molecule 300 corresponding to the second pixel unit 122. The above-mentioned alignment may include rubbing, and the pretilt angle direction of the liquid crystal molecule 300 generated by the rubbing alignment is consistent with the alignment direction, may be between 0 degrees and 1 degree. Specifically, the so-called "direction being consistent" means that the corner point or vertex of the pretilt angle of the liquid crystal molecule corresponds to the tail end of the alignment direction, and the opening position of the tilt angle corresponds to the head end of the alignment direction. The alignment is a necessary process for the liquid crystal display panel, and is a key process for arranging the liquid crystal molecules 300 in an orderly manner. In terms of its rubbing alignment, even if the process of reducing the pretilt angle of the liquid crystal molecule 300 is added, the pretilt angle of the liquid crystal molecule 300 cannot be made to reach 0 degrees. Therefore, after the rubbing alignment process, the liquid crystal molecules 300 must have a pretilt angle, which leads to the problems of light leakage in the dark state as well as color shift of the light leakage in the dark state of the display panel 20 of the IPS type and FPS type. Therefore, in this embodiment, by changing the direction of the pretilt angle of the liquid crystal molecules 300 of the adjacent pixel units, the optical path differences of the adjacent liquid crystal molecules 300 are different, and so the effect of neutralizing the color shift is achieved.

Specifically, the pretilt direction of the liquid crystal molecule 300 in the area of the first pixel unit 121 is opposite to the pretilt direction of the liquid crystal molecule 300 in the area of the second pixel unit 122. This could be done by improving the film layers on both sides of the liquid crystal molecules 300, where the film layer is topographically designed, such as the planarization layer (OC layer) on the color filter substrate side and the planarization layer (OC layer) on the array substrate side. A detailed description is as follows.

Figure 2:
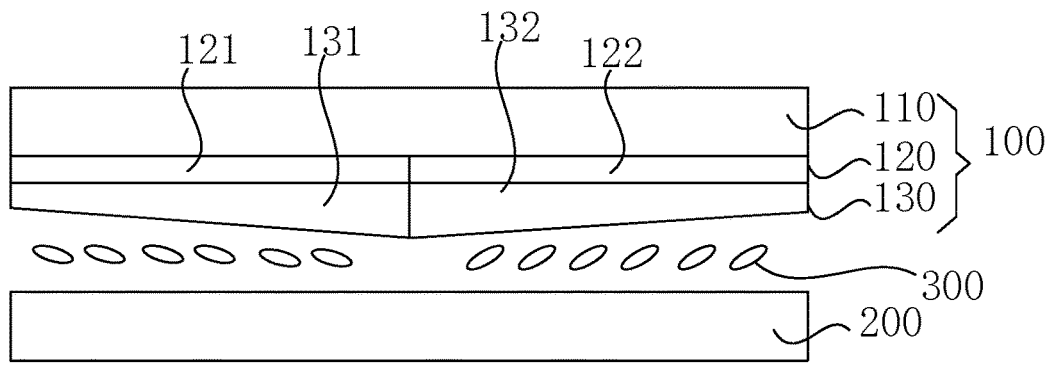
FIG. 2 is a schematic diagram of a second type of display panel according to the first embodiment of the present application.
Figure 3:
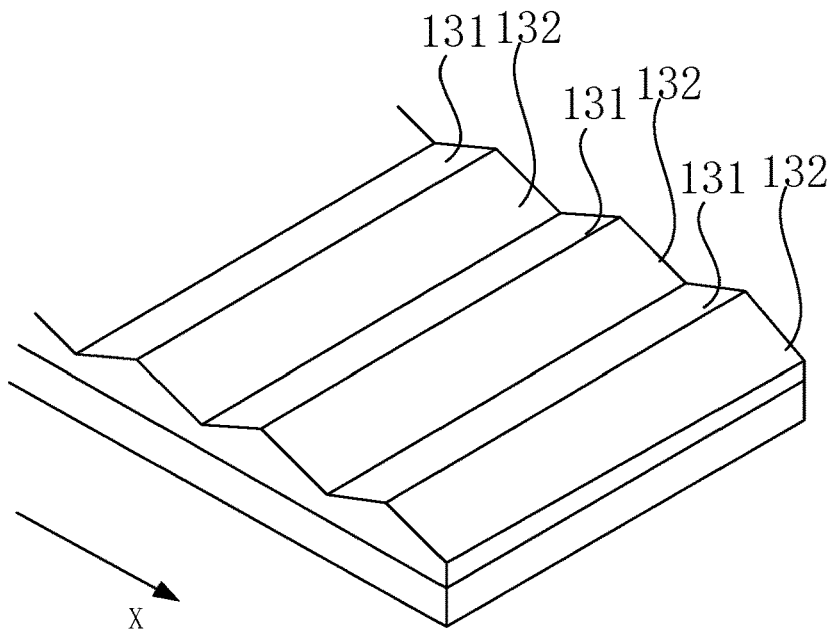
FIG. 3 is a schematic diagram of a first planarization layer according to the first embodiment of the present application.

FIG. 2 is a schematic diagram of a second type of display panel according to the first embodiment of the present application. FIG. 3 is a schematic diagram of a first planarization layer according to the first embodiment of the present application. As shown in FIGS. 2-3, the first substrate 100 further includes a first planarization layer 130. The first planarization layer 130 includes a plurality of columns of first planarization portions 131 and a plurality of columns of second planarization portions 132. The plurality of columns of the first planarization portion 131 and the plurality of columns of the second planarization portion 132 are alternately arranged. The first planarization portion 131 is disposed corresponding to the first pixel units 121. The second planarization portion 132 is disposed corresponding to the second pixel units 122. The surface of the first planarization portion 131 gradually rises along the alignment direction X, and the surface of the second planarization portion 132 gradually lowers along the alignment direction X. The first planarization portion 131 makes the opening direction of the first pretilt angle of the liquid crystal molecules 300 corresponding to the first pixel unit 121 opposite to the alignment direction X. The second planarization portion 132 makes the opening direction of the second pretilt angle of the liquid crystal molecule 300 corresponding to the second pixel unit 122 be in the same direction as the alignment direction X.

In this embodiment, the first planarization layer 130 is formed by arranging a plurality of columns of first planarization portions 131 and a plurality of columns of second planarization portions 132 alternately, and the surface of the first planarization portion 131 and the surface of the second planarization portion 132 have different inclination directions. That is, the surface of the first planarization layer 130 is provided as a plurality of surfaces inclined at different angles to each other, and the cross-sectional view thereof is a triangular-shaped protrusion formed by the first planarization portion 131 and the second planarization portion 132. In this embodiment, the first planarization portion 131 and the second planarization portion 132 generate different inclination degrees for the liquid crystal molecules 300, so as to compensate the pretilt angle generated by rubbing, so that the adjacent liquid crystal molecules 300 have completely opposite pretilt angles. However, due to the effective birefringence effect of the liquid crystal molecule 300 in the IPS type display panel 20, the linearly polarized light incident obliquely is modulated and becomes elliptically polarized after passing through the liquid crystal molecule 300. The polarizer cannot completely absorb the polarized light, resulting in light leakage and color shift. Corresponding to the rubbing direction X, in the direction of the head of the rubbing, the color of the light leakage is blue, and in the direction of the tail of the rubbing, the color of the light leakage is yellow. In this embodiment, the inclinations of the liquid crystal molecules 300 are compensated, so that the inclinations of adjacent liquid crystal molecules 300 are different, and the angles in different directions are matched. The optical path differences of the corresponding adjacent liquid crystal molecules 300 are different, so that a part of the adjacent liquid crystal molecules 300 is bluish, and a part is yellow, which are mutually neutralized and compensated for each other. Correspondingly, the consistency of the pretilt angles between the head direction and the tail direction of the rubbing is improved, so that the color shift color under multiple viewing angles is consistent, and there will be no phenomenon such as blue light leakage or yellow light leakage. In particular, there will be no yellowish light leakage in the head direction of the rubbing alignment, while the display color of the light leakage in the tail direction of the rubbing alignment is different.

It should be noted that the topographical design of the film layers in this application is not limited to the film layer design of the planarization layer. For the film layers on both sides of the liquid crystal molecules 300, such as an alignment layer, a transparent conductive layer, etc., the film topography design of any embodiment of the present application can be performed thereon.

It should be understood that, in a column of pixel units 120 here, the pixel unit 120 further includes a plurality of sub-pixels, and the plurality of sub-pixels are arranged in rows or columns. Each column of pixel units 120 includes one column of sub-pixels or multiple columns of sub-pixels. One column of the first planarization portions 131 is disposed corresponding to one column of the sub-pixels or multiple columns of sub-pixels. The pixel unit 120 in this embodiment is composed of multiple sub-pixels, and the pixel unit 120 refers to a collection of multiple sub-pixels. For example, one pixel unit 120 includes three sub-pixels, which are a red sub-pixel, a green sub-pixel and a blue sub-pixel respectively. The three sub-pixels constitute one pixel, that is, one pixel unit 120 corresponds to one pixel. For another example, a pixel unit 120 includes four sub-pixels, which are a red sub-pixel, a green sub-pixel, a blue sub-pixel and a white sub-pixel, respectively. Each sub-pixel is arranged corresponding to a scan line and a data line respectively. Taking three sub-pixels as an example, when the three sub-pixels are arranged in a column, one column of the first planarization portions 131 is designed to correspond to a column of sub-pixels, and an adjacent column of second planarization portions 132 is designed to correspond to another column of sub-pixels. This solution is the case where the first planarization portion 131 and the second planarization portion 132 are the narrowest, that is, they are designed to each correspond to one column of sub-pixels. The pretilt angles of the liquid crystal molecules 300 corresponding to every two adjacent columns of sub-pixels are different, so as to achieve the maximum neutralization effect. For three sub-pixels arranged in a row, that is, arranged along the alignment direction, a corresponding column of the first planarization portions 131 or a column of the second planarization portions 132 would be arranged corresponding to the area of three sub-pixels. The width of each of the first planarization portion 131 and the second planarization portion 132 would be wider than the above-mentioned one-to-one design. Correspondingly, the width of the first planarization portion 131 in this embodiment is relatively wide, corresponding to the width of a plurality of sub-pixels, so that the fabricating process of the planarization layer does not require particularly high precision, and a column of the first planarization portions 131 would correspond to a column of pixels. Correspondingly, one column of second planarization portions may also be disposed corresponding to one column of sub-pixels or multiple columns of sub-pixels, and details are not described herein again.

Of course, one pixel unit 120 defined in this embodiment may also include multiple pixel points, that is, one column of pixel units 120 corresponds to multiple pixel points. Taking the horizontally arranged RGB pixel points, one column of pixel units 120 is designed to correspond to six sub-pixels, and one pixel unit 120 stated in this embodiment may be a connection of multiple pixel points. For example, for vertically arranged RGB pixels, the first column is the main sub-pixel, and the second column is the auxiliary sub-pixel. For another example of vertically arranged RGB pixels, the first column is the main sub-pixel, the second column is another column of main sub-pixels, where two adjacent pixels in the two columns form a pixel unit 120. The difference between this embodiment and the above-mentioned embodiment is that the width of the first planarization portion 131 can be made wider.

Specifically, the thickness of the first planarization portion 131 gradually increases along the alignment direction, and the thickness of the second planarization portion 132 gradually decreases along the alignment direction. In this embodiment, by setting the thicknesses of the first planarization portion 131 and the second planarization portion 132, the surface of the first planarization portion 131 and the surface of the second planarization portion 132 are inclined to a certain extent, and their inclination directions are opposite. Of course, the thicknesses of the first planarization portion 131 and the second planarization portion 132 may be kept constant, so that the first planarization portion 131 and the second planarization portion 132 are inclined as a whole to reach the surfaces of the first planarization portion 131 and the second planarization portion 132 are inclined, where this solution also falls in the protection scope of the present application.

Specifically, the acute angle formed by the surface of the first planarization portion and the plane where the second substrate is located is greater than or equal to 1 degree and less than or equal to 3 degrees, and the acute angle formed by the surface of the second planarization portion and the plane where the second substrate is located is greater than or equal to 1 degree and less than or equal to 3 degrees. In this embodiment, the pretilt angle required by the liquid crystal molecules 300 does not need to be large, and only a proper tilt is required. Therefore, the inclination of the surfaces of the corresponding first planarization portion 131 and the second planarization portion 132 may be between 1 degree and 3 degrees. The liquid crystal molecules 300 corresponding to the first planarization portion 131 and the second planarization portion 132 under this tilt angle will have different optical path differences, thereby achieving the above-mentioned effects.

It should be understood that the inclination mentioned above refers to the inclination angle formed by the plane where the surface of the first planarization portion 131 is located and the horizontal plane (substrate surface), and the inclination angle is between 1 degree and 3 degrees. The corresponding liquid crystal molecules 300 will have a pretilt direction on the first planarization portion 131, and the pretilt direction of the liquid crystal molecules 300 is consistent with the tilt direction of the first planarization portion 131. The inclination direction of the liquid crystal molecules 300 produced by the alignment is consistent with the inclination direction produced by the second planarization portion 132, and the inclination direction of the liquid crystal molecules 300 produced by the alignment is the pretilt angle. Unless otherwise specified, the above-mentioned inclined angles are understood to be acute angles formed by inclinations.

Therefore, considering that the alignment will generate a pretilt angle of the liquid crystal molecules 300, if the tilt angles of the first planarization portion 131 and the second planarization portion 132 are the same, then the pretilt angle of the liquid crystal molecules 300 corresponding to the second planarization portion 132 due to the alignment will make the inclination angle of the liquid crystal molecules 300 in this part greater than the inclination of the liquid crystal molecules 300 corresponding to the first planarization portion 131. In this embodiment, the inclination of the surface of the first planarization portion 131 is greater than the inclination of the surface of the second planarization portion 132. Since in practice, the pretilt angle generated by the alignment varies within a certain range, correspondingly in this embodiment, it is only needed that the inclination of the surface of the first planarization portion 131 is equal to the sum of the inclination of the surface of the second planarization portion 132 and the pretilt angle generated by the alignment. For example, when the pretilt angle generated by the alignment is 0.5 degrees, the inclination of the surface of the first planarization portion 131 is 0.5 degrees greater than the inclination of the second planarization portion 132, thereby realizing the goal of the tilt angle of the liquid crystal molecules 300 corresponding to the first planarization portion 131 being consistent with the tilt angle of the liquid crystal molecules 300 corresponding to the second planarization portion 132, so that the inclination angle of the liquid crystal molecules 300 corresponding to the first planarization portion 131 is exactly opposite to the inclination angle of the liquid crystal molecules 300 corresponding to the second planarization portion 132. That is, the first pretilt angle is equal to the second pretilt angle, but the inclination is the same, and the corresponding adjacent liquid crystal molecules 300 only have optical path differences of different angles, but the actual light transmittance is the same.

In another variant embodiment, the inclination angle of the second planarization portion 132 may also be set to 0 degree-1 degree, and the corresponding inclination of the first planarization portion 131 is between 1 degree and 2 degrees. In the case of this embodiment, the second planarization portion 132 does not need to be inclined, or the surface of the second planarization portion 132 only needs to be slightly inclined. That is, the surface of the first planarization portion is gradually raised along the alignment direction of the first substrate, and the surface of the second planarization portion is parallel or regarded as parallel to the surface of the second substrate, so that the first pretilt angle of the liquid crystal molecules corresponding to the first pixel unit is consistent with the alignment direction of the first substrate. This solution can save the manufacturing process of the second planarization portion 132.

Figure 4:
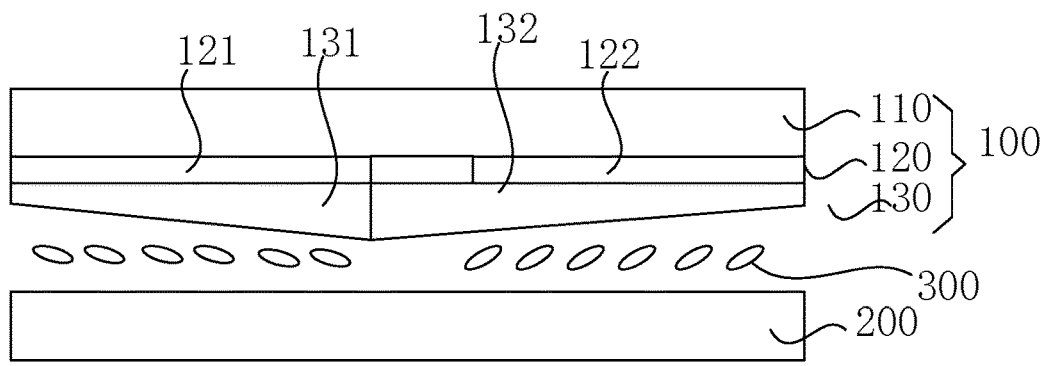
FIG. 4 is a schematic diagram of a third type of display panel according to the first embodiment of the present application.

FIG. 4 is a schematic diagram of a third type of display panel according to the first embodiment of the present application. As shown in FIG. 4, the width of the first planarization portion 131 is smaller than the width of the second planarization portion 132. In practical applications, a light shielding layer, such as a black matrix, is also provided between adjacent pixel units 120 or adjacent sub-pixels. The area corresponding to the light shielding layer does not emit light, so the width corresponding to the first planarization portion 131 can be set narrower than that of the second planarization portion 132. The reason is that, since the inclination angle of the first planarization portion 131 is greater than the inclination angle of the first planarization portion 131, in order to make the transition between the first planarization portion 131 and the second planarization portion 132 smoother and avoid the situation that the highest position of the first planarization portion 131 is greater than the highest position of the second planarization portion 132, the second planarization portion 132 set wider so that in the case where the inclination angle of the second planarization portion 132 is small, the highest position of the surface of the second planarization portion 132 is also equal to the highest position of the surface of the first planarization portion 131. That is, the maximum height of the surface of the first planarization portion 131 is consistent with the maximum height of the surface of the second planarization portion 132, and the minimum height of the surface of the first planarization portion 131 is the same as the minimum height of the surface of the second planarization portion 132.

In another embodiment, a transition portion may also be provided directly between the first planarization portion 131 and the second planarization portion 132, and the transition portion is disposed corresponding to the black matrix. Due to the height difference of the surface of the transition portion, the height of one side is consistent with the highest height of the first planarization portion 131, and the height of the other side is consistent with the highest height of the second planarization portion 132. The transition between the corresponding first planarization portion 131 and the second planarization portion 132 at the lowest position can also be provided with a transition portion, so as to achieve the overall smoothness of the first planarization layer 130.

Specifically, the inclinations of the first planarization portion 131 and the second planarization portion 132 in the present application can be achieved in two methods. The first method is to realize the inclination angles of the first planarization portion 131 and the second planarization portion 132 through the technique of gray tone mask. The second method is to use an imprinting technique to first manufacture an imprinted substrate, and imprint on the planarization layer to obtain the first planarization portion 131 and the second planarization portion 132 alternately arranged in multiple columns.

Figure 5:
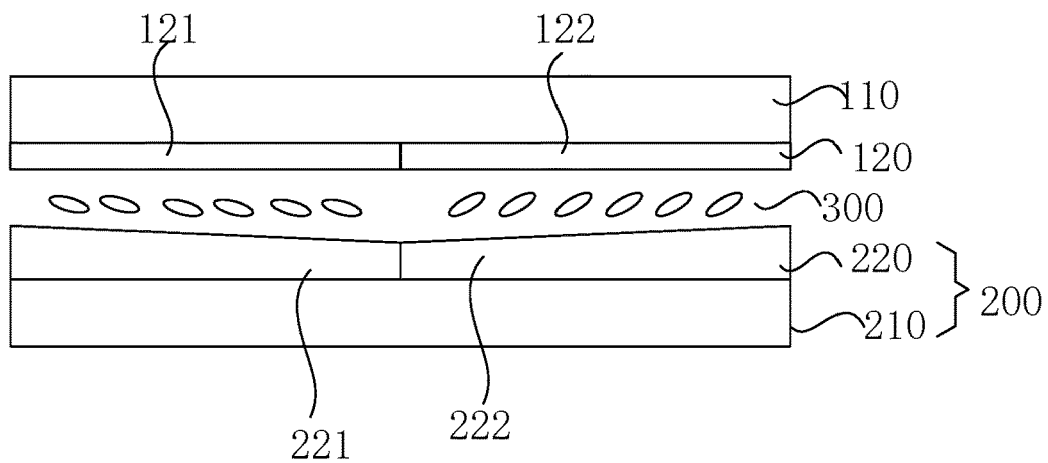
FIG. 5 is a schematic diagram of a display panel according to a second embodiment of the present application.

FIG. 5 is a schematic diagram of a display panel according to a second embodiment of the present application. This embodiment is different from the above-mentioned embodiments in that the film layers on the array substrate are improved. As shown in FIG. 5, the present application discloses another display panel 20. The display panel 20 includes a second substrate 200. The second substrate 200 is an array substrate. The second substrate 200 includes a second base 210 and a second planarization layer 220. The second planarization layer 220 is disposed on the second base 210. The second planarization layer 220 includes a plurality of columns of third planarization portions 221 and a plurality of columns of fourth planarization portions 222. The plurality of columns of the third planarization portions 221 and the plurality of columns of the fourth planarization portions 222 are alternately arranged. The third planarization portion 221 is arranged corresponding to the first pixel unit 121, and the fourth planarization portion 222 is arranged corresponding to the second pixel unit 122. The inclination direction of the surface of the third planarization portion 221 is opposite to the inclination direction of the surface of the fourth planarization portion 222.

Specifically, the design of the second planarization layer 220 in this embodiment is the same as that of the first planarization layer 130 in the above-mentioned first embodiment, and the designs of the third planarization portion 221 and the fourth planarization portion 222 are the same as those of the first planarization portion 131 and the second planarization portion 132 described above. Correspondingly, the surface of the third planarization portion 221 gradually lowers along the alignment direction, the surface of the fourth planarization portion 222 gradually rises along the alignment direction, and the maximum height of the third planarization portion 221 is consistent with the maximum height of the fourth planarization portion 222, and the minimum height of the third planarization portion 221 is consistent with the minimum height of the fourth planarization portion 222. The third planarization portion 221 makes the pretilt direction of the liquid crystal molecules 300 corresponding to the first pixel unit 121 be in the same direction as the alignment direction. The fourth planarization portion 222 makes the pretilt direction of the liquid crystal molecules 300 corresponding to the second pixel unit 122 be opposite to the alignment direction.

This embodiment is different from the above-mentioned embodiment in which the first planarization layer 130 is disposed on the color filter substrate, namely the second planarization layer 220 is disposed on the array substrate, and for the IPS and FPS display panels 20, the common electrodes thereof are also arranged on the array substrate. Therefore, in terms of disposing the second planarization layer 220 on the array substrate, it is closer to the common electrode layer and the pixel electrode layer, and has a stronger ability to control the initial state of the liquid crystal molecules 300, so that the liquid crystal molecules 300 have different pretilt angles in the initial state and are rotated under the electric field of the pixel electrode and the common electrode, resulting in better effect.

Figure 6:
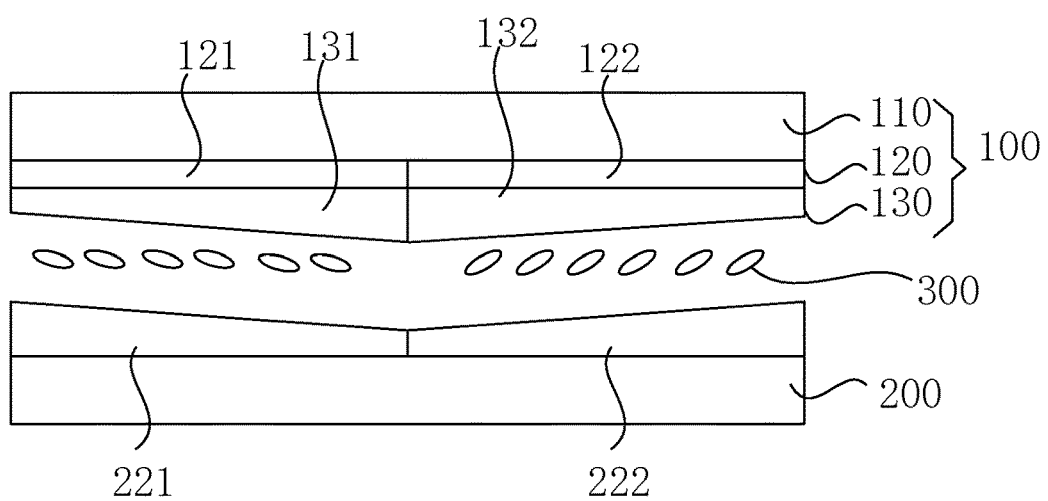
FIG. 6 is a schematic diagram of a display panel according to a third embodiment of the present application.

FIG. 6 is a schematic diagram of a display panel according to a third embodiment of the present application. As shown in 6, this embodiment discloses a display panel 20. The display panel 20 includes a first substrate 100, a second substrate 200 and a liquid crystal layer disposed between the first substrate 100 and the second substrate 200. The first substrate 100 includes a first base 110 and a plurality of pixel units 120. The pixel units 120 are arranged on the first base in an array. Among the plurality of pixel units 120, the pixel units 120 in odd columns are first pixel units 121, and the pixel units 120 in even columns are second pixel units 122. The direction in which a column of pixel units 120 is located is perpendicular to the alignment direction. The pretilt direction of the liquid crystal molecules 300 corresponding to the first pixel unit 121 is opposite to the pretilt direction of the liquid crystal molecules 300 corresponding to the second pixel unit 122.

The first substrate 100 further includes a first planarization layer 130. The first planarization layer 130 includes a plurality of columns of first planarization portions 131 and a plurality of columns of second planarization portions 132. The plurality of columns of first planarization portions 131 and the plurality of columns of second planarization portion 132 are arranged alternately. The first planarization portion 131 is arranged corresponding to the first pixel units 121, and the second planarization portion 132 is arranged corresponding to the second pixel units 122. The surface of the first planarization portion 131 is gradually raised along the alignment direction. The surface of the second planarization portion 132 gradually lowered along the alignment direction. The first planarization portion 131 makes the pretilt direction of the liquid crystal molecules 300 corresponding to the first pixel unit 121 opposite to the alignment direction. The second planarization portion 132 makes the pretilt direction of the liquid crystal molecules 300 corresponding to the second pixel unit 122 be in the same direction as the alignment direction.

The second substrate 200 includes a second base 210 and a second planarization layer 220. The second planarization layer 220 is disposed on the second base 210. The second planarization layer 220 includes a plurality of columns of third planarization portions 221 and a plurality of columns of fourth planarization portions 222. The plurality of columns of third planarization portions 221 and the plurality of columns of fourth planarization portions 222 are arranged alternately. The third planarization portions 221 are disposed corresponding to the first pixel units 121. The fourth planarization portions 222 are disposed corresponding to the second pixel units 122. The inclination direction of the surface of the third planarization portions 221 is opposite to the inclination direction of the surface of the fourth planarization portions 222.

Specifically, the surface of the third planarization portion 221 gradually lowers along the alignment direction, and the surface of the fourth planarization portion 222 gradually rises along the alignment direction. The maximum height of the third planarization portion 221 is consistent with the maximum height of the fourth planarization portion 222. The minimum height of the third planarization portion 221 is consistent with the minimum height of the fourth planarization portion 222. The third planarization portions 221 make the pretilt direction of the liquid crystal molecules 300 corresponding to the first pixel units 121 be in the same direction as the alignment direction. The fourth planarization portions 222 make the pretilt direction of the liquid crystal molecules 300 corresponding to the second pixel units 122 be opposite to the alignment direction.

In the present application, by changing the pretilt directions of adjacent pixel units 120, the pretilt directions of the liquid crystal molecules 300 corresponding to the adjacent pixel units 120 are opposite to each other. That is, the pretilt direction of the liquid crystal molecules 300 in the area of the first pixel unit 121 is opposite to the pretilt direction of the liquid crystal molecules 300 in the area of the second pixel unit 122. Therefore, the liquid crystal molecules 300 corresponding to the first pixel unit 121 and the second pixel unit 122 have different optical path differences. Moreover, the first pixel unit 121 and the second pixel unit 122 are arranged alternately, and so the corresponding liquid crystal molecules 300 in different pretilt directions are also arranged alternately, so that the liquid crystal molecules 300 with different optical path differences can compensate each other so as to make up for the color shift problem caused by a single optical path difference in the case of light leakage in the dark state. In short, by changing the pretilt angle of the liquid crystal molecules 300, the angles in different directions are matched and compensated for each other, so as to achieve the effect of improving the color shift of light leakage in the dark state. Specifically, the first planarization layer 130 is disposed on the first substrate 100, the second planarization layer 220 is disposed on the second substrate 200, and the first planarization layer 130 and the second planarization layer 220 are arranged in cooperation with each other, so that the pretilt direction of the liquid crystal molecules 300 in the area of the first pixel unit 121 is opposite to the pretilt direction of the liquid crystal molecules 300 in the area of the second pixel unit 122. Both sides of the liquid crystal molecules 300 are respectively provided with tilt angles, which can better change the pretilt angle of the liquid crystal molecules 300, so that the angles in different directions can be matched and compensated for each other, so as to achieve the effect of improving the color shift of light leakage in the dark state.

Figure 7:
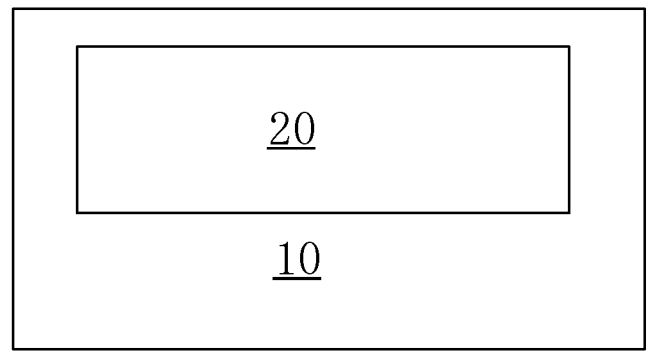
FIG. 7 is a schematic diagram of a display device according to a fourth embodiment of the present application.

FIG. 7 is a schematic diagram of a display device according to a fourth embodiment of the present application. As shown in FIG. 7, the present application further discloses a display device 10. The display device 10 includes any one of the display panels 20 disclosed in the first embodiment, the second embodiment or the third embodiment.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display panel, comprising a first substrate, a second substrate, and a liquid crystal layer disposed between the first substrate and the second substrate; wherein the first substrate comprises a first base and a plurality of pixel units disposed on the first base in an array; wherein among the plurality of pixel units, the pixel units in odd-numbered columns are first pixel units, the pixel units in even-numbered columns are second pixel units, wherein an alignment direction of the first substrate is perpendicular to an extending direction of a column of the pixel units;
wherein a liquid crystal molecule corresponding to each first pixel unit defines a first pretilt angle, a liquid crystal molecule corresponding to each second pixel unit defines a second pretilt angle; wherein an opening direction of the first pretilt angle is consistent with an alignment direction of the first substrate, and an opening direction of the second pretilt angle is opposite to the alignment direction of the first substrate;
wherein the second substrate comprises a second base and a second planarization layer disposed on the second base; wherein the second planarization layer comprises a plurality of columns of third planarization portions and a plurality of columns of fourth planarization portions;
wherein the plurality of columns of third planarization portions are alternately arranged with the plurality of columns of fourth planarization portions; wherein the plurality of columns of third planarization portions are disposed corresponding to the first pixel units, and the plurality of columns of fourth planarization portions are disposed corresponding to the second pixel units;
wherein a surface of each third planarization portion is gradually lowered along the alignment direction, and a surface of each fourth planarization portion is gradually raised along the alignment direction.

2. The display panel of claim 1, wherein the first substrate further comprises a first planarization layer, which comprises a plurality of columns of first planarization portions and a plurality of columns of second planarization portions; wherein the plurality of columns of first planarization portions are disposed corresponding to the first pixel units, and the plurality of columns of second planarization portions are disposed corresponding to the second pixel units;
wherein a surface of each first planarization portion is gradually raised along the alignment direction, and a surface of each second planarization portion is gradually lowered along the alignment direction;
wherein each first planarization portion is configured to make an opening direction of the first pretilt angle of the liquid crystal molecule corresponding to the respective first pixel unit consistent with the alignment direction of the first substrate; and
wherein each second planarization portion is configured to make an opening direction of the second pretilt angle of the liquid crystal molecule corresponding to the respective second pixel unit opposite to the alignment direction of the first substrate.

3. The display panel of claim 2, wherein a maximum height of the surface of each first planarization portion is consistent with a maximum height of the surface of each second planarization portion;
wherein a minimum height of the surface of each first planarization portion is consistent with a minimum height of the surface of each second planarization portion.

4. The display panel of claim 2, wherein a thickness of each first planarization portion gradually increases along the alignment direction, and wherein a thickness of each second planarization portion gradually decreases along the alignment direction;
wherein an acute angle formed between a surface of each first planarization portion and a plane in which the second substrate is located is greater than or equal to 1 degree and less than or equal to 3 degrees; and wherein an acute angle formed between a surface of each second planarization portion and the plane in which the second substrate is located is greater than or equal to 1 degree and less than or equal to 3 degrees.

5. The display panel of claim 4, wherein the acute angle formed between the surface of the first planarization portion and the plane in which the second substrate is located is greater than the acute angle formed between the surface of the second planarization portion and the plane in which the second substrate is located; and wherein a width of each first planarization portion in the alignment direction is less than a width of the second planarization portion in the alignment direction.

6. The display panel of claim 5, wherein the first pretilt angle is equal to the second pretilt angle.

7. The display panel of claim 2, wherein each pixel unit comprises a plurality of sub-pixels, which are arranged in rows or columns;
wherein each column of pixel units comprises one column of sub-pixels or a plurality of columns of sub-pixels;
wherein each column of the first planarization portion is disposed corresponding to a respective column of the sub-pixels or a plurality of columns of the sub-pixels;
wherein each column of the second planarization portions is disposed corresponding to a respective column of the sub-pixels or a plurality of columns of the sub-pixels.

8. The display panel of claim 1, wherein the acute angle formed between a direction of a long axis of a liquid crystal molecule corresponding to each first pixel unit and a plane in which the second substrate is located is the first pretilt angle, and wherein an acute angle formed between a direction of a long axis of a liquid crystal molecule corresponding to each second pixel unit and a plane in which the second substrate is located is the second pretilt angle.

9. The display panel of claim 2, wherein a transition portion is disposed between the first planarization portion and the second planarization portion, wherein the transition part is disposed corresponding to the black matrix, wherein a surface of the transition portion comprises a height difference, wherein a height of one side is consistent with a highest height of the first planarization portion, and a height of the other side is consistent with a highest height of the second planarization portion 132.

10. A display device comprising a display panel, the display panel comprising a first substrate, a second substrate, and a liquid crystal layer disposed between the first substrate and the second substrate; wherein the first substrate comprises a first base and a plurality of pixel units disposed on the first base in an array; wherein among the plurality of pixel units, the pixel units in odd-numbered columns are first pixel units, the pixel units in even-numbered columns are second pixel units, wherein an alignment direction of the first substrate is perpendicular to an extending direction of a column of the pixel units;

wherein a liquid crystal molecule corresponding to each first pixel unit defines a first pretilt angle, a liquid crystal molecule corresponding to each second pixel unit defines a second pretilt angle; wherein an opening direction of the first pretilt angle is consistent with an alignment direction of the first substrate, and an opening direction of the second pretilt angle is opposite to the alignment direction of the first substrate;

wherein the second substrate comprises a second base and a second planarization layer disposed on the second base; wherein the second planarization layer comprises a plurality of columns of third planarization portions and a plurality of columns of fourth planarization portions;

wherein the plurality of columns of third planarization portions are alternately arranged with the plurality of columns of fourth planarization portions; wherein the plurality of columns of third planarization portions are disposed corresponding to the first pixel units, and the plurality of columns of fourth planarization portions are disposed corresponding to the second pixel units;

wherein a surface of each third planarization portion is gradually lowered along the alignment direction, and a surface of each fourth planarization portion is gradually raised along the alignment direction.

11. The display device of claim 10, wherein the first substrate further comprises a first planarization layer, which comprises a plurality of columns of first planarization portions and a plurality of columns of second planarization portions; wherein the plurality of columns of first planarization portions are disposed corresponding to the first pixel units, and the plurality of columns of second planarization portions are disposed corresponding to the second pixel units;

wherein a surface of each first planarization portion is gradually raised along the alignment direction, and a surface of each second planarization portion is gradually lowered along the alignment direction;

wherein each first planarization portion is configured to make an opening direction of the first pretilt angle of the liquid crystal molecule corresponding to the first pixel unit consistent with the alignment direction of the first substrate; and wherein each second planarization portion is configured to make an opening direction of the second pretilt angle of the liquid crystal molecule corresponding to the second pixel unit opposite to the alignment direction of the first substrate.

12. The display panel of claim 11, wherein a maximum height of the surface of each first planarization portion is consistent with a maximum height of the surface of each second planarization portion, wherein a minimum height of the surface of each first planarization portion is consistent with a minimum height of the surface of each second planarization portion.

* * * * *